US011117092B2

(12) United States Patent
Li et al.

(10) Patent No.: US 11,117,092 B2
(45) Date of Patent: Sep. 14, 2021

(54) ENERGY EFFICIENT MEMBRANE-BASED PROCESS FOR $CO_2$ CAPTURE

(71) Applicant: GAS TECHNOLOGY INSTITUTE, Des Plaines, IL (US)

(72) Inventors: Shiguang Li, Mount Prospect, IL (US); Travis Pyrzynski, Elgin, IL (US)

(73) Assignee: GAS TECHNOLOGY INSTITUTE, Des Plaines, IL (US)

( * ) Notice: Subject to any disclaimer, the term of this patent is extended or adjusted under 35 U.S.C. 154(b) by 0 days.

(21) Appl. No.: 16/353,061

(22) Filed: Mar. 14, 2019

(65) Prior Publication Data

US 2019/0282952 A1 Sep. 19, 2019

Related U.S. Application Data

(60) Provisional application No. 62/642,783, filed on Mar. 14, 2018.

(51) Int. Cl.
*B01D 53/22* (2006.01)
*B01D 71/02* (2006.01)
*B01D 53/26* (2006.01)
*C01B 32/50* (2017.01)

(52) U.S. Cl.
CPC ......... *B01D 53/226* (2013.01); *B01D 53/265* (2013.01); *B01D 71/024* (2013.01); *C01B 32/50* (2017.08); *B01D 2053/221* (2013.01); *C01B 2210/0012* (2013.01); *C01B 2210/0046* (2013.01)

(58) Field of Classification Search
CPC ........ B01D 53/22; B01D 71/02; B01D 53/26; B01D 53/226; B01D 71/024; B01D 53/265
See application file for complete search history.

(56) References Cited

U.S. PATENT DOCUMENTS

| 5,843,209 A | 12/1998 | Ray et al. | |
|---|---|---|---|
| 8,535,417 B2 * | 9/2013 | Shah ..................... | B01D 53/002 95/103 |
| 2011/0167821 A1 | 7/2011 | Baker et al. | |

(Continued)

FOREIGN PATENT DOCUMENTS

| WO | WO 2016/196056 A1 | 12/2016 | |
|---|---|---|---|
| WO | WO-2016196056 A1 * | 12/2016 | ........... B01D 53/226 |

OTHER PUBLICATIONS

U.S. Patent Office, English language version of the International Search Report, Form PCT/ISA/210 for International Application PCT/US2019/22265, dated Jun. 7, 2019 (1 page).

(Continued)

*Primary Examiner* — Youngsul Jeong
(74) *Attorney, Agent, or Firm* — Pauley Erickson & Swanson

(57) ABSTRACT

Processes and systems for the energy efficient capture of $CO_2$ from a flue gas stream such as produced or resulting from power plant operation, are provided. The processes and systems integrate the use of high $CO_2/N_2$ selectivity membranes and high $CO_2$ flux membranes, to capture $CO_2$. Useful membranes can desirably be graphene oxide-based membranes.

17 Claims, 2 Drawing Sheets

(56) References Cited

U.S. PATENT DOCUMENTS

2016/0074814 A1* 3/2016 Park .................... B01D 71/021
  210/500.33
2016/0245126 A1 8/2016 Gerber

OTHER PUBLICATIONS

U.S. Patent Office, English language version of the Written Opinion of the International Searching Authority, Form PCT/ISA/237 for International Application PCT/US2019/22265, dated Jun. 7, 2019 (7 pages).
"Existing Plants, Emissions and Capture—Setting Water—Energy R&D Program Goals," National Energy Technology Laboratory, U.S. Department of Energy, May 8, 2009, 21 pages.
Amo et al.,"Pilot Testing of a Membrane System for Post-Combustion CO2 Capture DE-FE0005795," Membrane Technology & Research, NETL CO2 Capture Technology Meeting, Jul. 31, 2014, 21 pages.
Ho,"Novel CO2—Selective Membranes for CO2 Capture from <1% CO2 Sources DE-FE0026919," William G. Lowrie Department of Chemicals & Biomolecular Engineering Department of Materials Science and Engineering The Ohio State University, 2017 NETL CO2 Capture Technology Project Review Meeting Pittsburgh, PA, Aug. 21-25, 2017, 24 pages.
Freeman,"Bench-Scale Development of a Hybrid Membrane-Absorption CO2 Capture Process," Membrane Technology & Research, Inc., 2014 NETL CO2 Capture Technology Meeting Pittsburgh, PA, Jul. 31, 2014, 17 pages.
Caro et al.,"Zeolite membranes—Recent developments and progress," Elsevier, Microporous and Mesoporous Materials, Mar. 6, 2008, pp. 215-233.
"Cost and Performance Baseline for Fossil Energy Plants vol. 1: Bituminous Coal and Natural Gas to Electricity," National Energy Technology Laboratory, U.S. Department of Energy, Revision 2a p. 63, Sep. 2013, Revision 2, Nov. 2010, DOE/NETL-2010/1397 (6 pages).

* cited by examiner

ENERGY EFFICIENT MEMBRANE-BASED PROCESS FOR $CO_2$ CAPTURE

CROSS REFERENCE TO RELATED APPLICATION

This application also claims the benefit of U.S. Provisional Patent Application Ser. No. 62/642,783, filed on 14 Mar. 2018. This Provisional Application is hereby incorporated by reference herein in its entirety and is made a part hereof, including but not limited to those portions which specifically appear hereinafter.

STATEMENT REGARDING FEDERALLY SPONSORED RESEARCH OR DEVELOPMENT

This invention was made with government support under grant DE-FE0031598 awarded by DOE NETL. The government has certain rights in the invention.

BACKGROUND OF THE INVENTION

Field of the Invention

This invention relates generally to $CO_2$ capture and, more particularly, to such capture via or employing high selectivity membranes.

Description of Related Art

Amine absorption is the current DOE and industry benchmark technology for capture of $CO_2$ from power plant flue gases. DOE/NETL systems analysis studies estimated that using a chemical absorption with an aqueous monoethanolamine system to capture 90% of the $CO_2$ from flue gas will require an increase in the levelized cost of energy (LCOE) services of 75-85%. These values are well above the 2020 DOE NETL Sequestration Program post-combustion capture goal of 90% capture in existing plants with less than 35% increase in LCOE. Therefore, it is important to develop new advanced $CO_2$ capture technologies in order to maintain the cost-effectiveness of U.S. coal-fired power generation.

As identified above, amine absorption is the current DOE and industry benchmark technology for capture of $CO_2$ from power plant flue gases.

Additional technologies include:
1. Conventional Gas Separation Membrane Process:

Membrane Technology and Research (MTR) has developed a gas separation membrane, Polaris™, which exhibited pure-gas $CO_2$ permeance of about 1,650 GPU at 50° C. with an ideal selectivity (ratio of single gas permeances) of about 50 for $CO_2/N_2$. Ho et al. at Ohio State University (OSU) prepared zeolite/polymer composite membranes containing amine cover layer for $CO_2$ capture. The scaled membranes showed selectivities of 140 for binary $CO_2/N_2$ mixtures.

2. Hybrid Solvent/Membrane Process:

The University of Kentucky is developing an absorption solvent/membrane hybrid process. The absorption cycle uses aqueous ammonium and some typical alkyl amines. A T-type hydrophilic zeolite membrane is placed between the absorption and regeneration steps to reject water allowing a more concentrated solution to be sent to the regenerator. The high cost of zeolite membrane may limit the practical application of this technology; Caro et al. reported a cost of about US $3,000/m² for zeolite modules of which 10-15% is contributed to the membrane itself.

MTR and University of Texas at Austin are developing a hybrid piperazine solvent/Polaris™ membranes process for $CO_2$ capture. They reported that a hybrid series configuration requires a minimum of 70% removal by amine process, whereas a hybrid parallel configuration requires a minimum of 53% to 65% of the flue gas directed to the amine absorber.

3. Gas Technology Institute's Membrane Contactor Process:

Polyetheretherketone (PEEK) hollow fiber membrane contactor process is a hybrid membrane/absorption process in which flue gas is sent through the hollow fiber membrane tubes while a $CO_2$-selective solvent flows around the outer surface of the hollow fiber membrane tubes, allowing $CO_2$ to permeate through the membrane and absorb into the solvent. The $CO_2$-rich solvent is regenerated and sent back to the membrane absorber.

SUMMARY OF THE INVENTION

The invention relates to methods and systems for the separation and capture of $CO_2$ such as produced or resulting from power plant operation. In accordance with certain preferred embodiments, a transformational high $CO_2/N_2$ selectivity membrane [e.g., a graphene oxide (GO)-based membrane] can be installed in new or retrofitted into existing operations such as pulverized coal (PC) or natural gas power plants to separate and capture $CO_2$.

In one embodiment, the invention integrates a high $CO_2/N_2$ selectivity membrane [e.g. GO-based membranes] and a high $CO_2$ flux membrane. The invention offers new opportunities to explore significant reductions in the cost of $CO_2$ capture.

One aspect of the invention regards energy efficient processing for the capture of $CO_2$ such as produced upon operation of a power plant.

In accordance with one embodiment, such a process is particularly useful for the capture of $CO_2$ from a flue gas stream containing at least 5 vol. % $CO_2$. Such a process involves:

introducing the flue gas stream containing at least 5 vol. % $CO_2$ to a first stage membrane separator containing a first stage high $CO_2/N_2$ selectivity membrane to produce a first stage $CO_2$-depleted retentate stream and a first stage $CO_2$-enriched permeate stream;

introducing the first stage $CO_2$-depleted retentate stream to a second stage membrane separator containing a second stage high flux membrane to produce a second stage further $CO_2$-depleted retentate stream and a second stage $CO_2$-enriched permeate stream;

treating the second stage $CO_2$-enriched permeate stream to recover water and form a recyclable $CO_2$ stream;

introducing the recyclable $CO_2$ stream to the first stage membrane separator;

treating the first stage $CO_2$-enriched permeate stream to recover water and form a non-condensable $CO_2$-rich stream; and compressing the $CO_2$ of the $CO_2$-rich stream to form a capture quantity of $CO_2$.

In accordance with one embodiment, such a process is particularly useful for the capture of $CO_2$ from a flue gas stream containing less than 5 vol. % $CO_2$. Such a process involves:

introducing the flue gas stream containing less than 5 vol. % $CO_2$ to a second stage membrane separator containing a second stage high flux membrane to produce a second stage $CO_2$-depleted retentate stream and a second stage $CO_2$-enriched permeate stream;

treating the second stage CO$_2$-enriched permeate stream to recover water and form a recyclable CO$_2$ stream;

introducing the recyclable CO$_2$ stream to a first stage membrane separator containing a first stage high CO$_2$/N$_2$ selectivity membrane to produce a first stage CO$_2$-depleted retentate stream and a first stage CO$_2$-enriched permeate stream;

treating the first stage CO$_2$-enriched permeate stream to recover water and form a non-condensable CO$_2$-rich stream;

introducing the first stage CO$_2$-depleted retentate stream to the second stage membrane separator; and compressing the CO$_2$-rich stream to a sequestration pressure.

Another aspect of the invention regards s system for capture of CO$_2$ from a flue gas stream.

In accordance with one embodiment, such a system includes a first stage membrane separator containing a first stage high CO$_2$/N$_2$ selectivity membrane. A first stage vacuum pump is included to provide a vacuum on a permeate side of the first stage high CO$_2$/N$_2$ selectivity membrane. The first stage membrane separator produces a first stage CO$_2$-depleted retentate stream and a first stage CO$_2$-enriched permeate stream. The system further includes a second stage membrane separator containing a second stage high flux membrane, with the second stage separator receiving the CO$_2$-depleted retentate stream. A second stage vacuum pump is included to provide a vacuum on a permeate side of the second stage high flux membrane. The second stage membrane separator produces a second stage CO$_2$-depleted retentate stream and a second stage CO$_2$-enriched permeate stream.

As used herein, gas permeance of membranes is customarily expressed in GPU (Gas Permeation Unit, 1 GPU=1× 10$^{-6}$ cm$^3$ (STP)/cm$^2$·s·cmHg=3.348×10$^{-10}$ mol/(m$^2$·s·Pa)), and is calculated by the equation:

$$(P_i/l) = \frac{J_i}{\Delta P_i A}$$

where:

($P_i$/l) denotes the gas permeance of "i";

$J_i$ denotes the gas molar flow rate through the membrane (mol/s);

$\Delta P_i$ denotes the gas partial pressure difference between feed and permeate sides (Pa); and A denotes the membrane active area (m$^2$).

As used herein, gas selectivity ($a_{ij}$) of membranes can be calculated by the equation:

$a_{ij} = (P_i/l)/(P_j/l)$

BRIEF DESCRIPTION OF THE DRAWINGS

Objects and features of this invention will be better understood from the following description taken in conjunction with the drawings, wherein.

DETAILED DESCRIPTION

Figure 1:
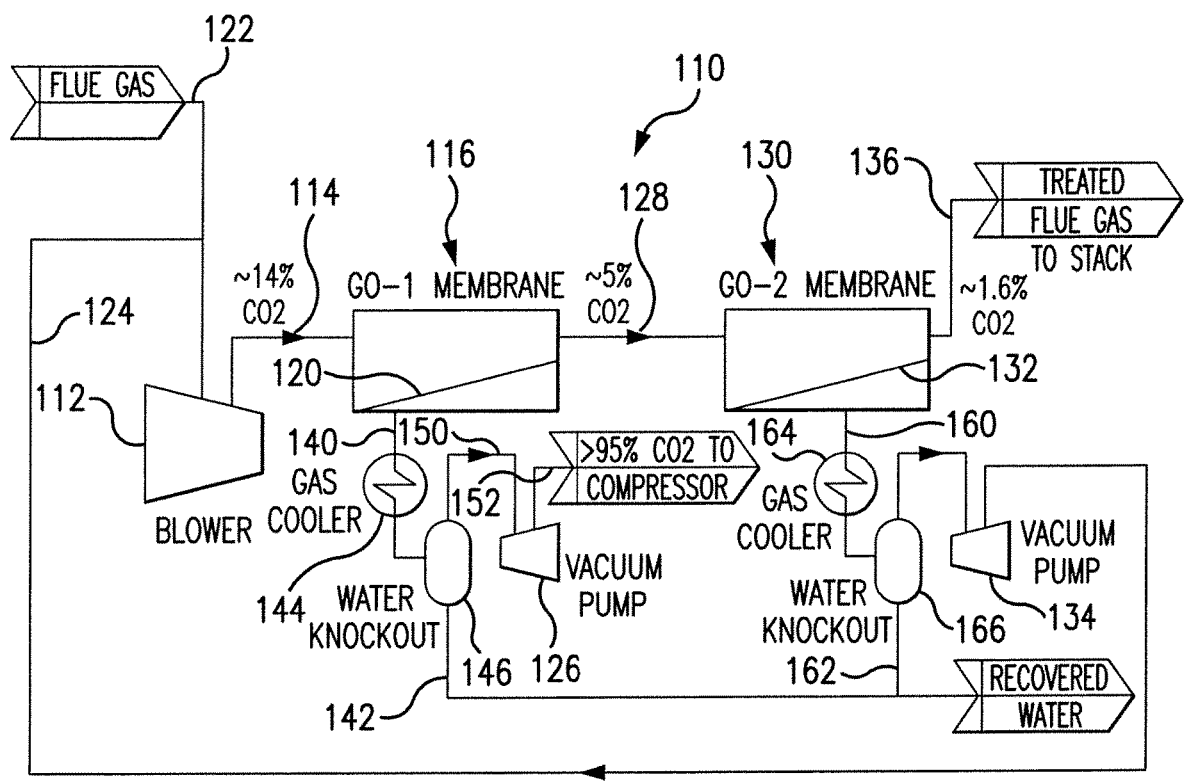
FIG. 1 is a simplified process flow diagram illustrating application of processing in accordance with one embodiment of the invention.

FIG. 1 is a process flow diagram of a processing system, generally designated by the reference numeral 110, illustrating application of processing in accordance with one embodiment of the invention. As detailed below and in accordance with one embodiment of the invention, the processing system 110 can advantageously energy efficiently process the capture of CO$_2$ from a flue gas stream containing at least 5 vol. % CO$_2$. For example, such embodiment might find particular application in the processing of CO$_2$-containing flue gas streams produced or resulting from power plant operations utilizing pulverized coal (PC), including installed in new or retrofitted into existing operations. It is to be understood, however, that the broader practice of the invention is not necessarily so limited.

In the processing system 110, a blower 112 is used to send a flue gas (stream 114 and such as containing at least 5 vol. % CO$_2$) to a first stage membrane separator 116 such as including or containing a first stage high CO$_2$/N$_2$ selectivity membrane 120 [e.g., a high selectivity membrane (such as, a graphene oxide (GO)-based membrane) having or exhibiting a CO$_2$/N$_2$ selectivity >120, for example)]. The stream 114 can desirably be composed of flue gas such as produced or resulting from operation of a power plant, shown as stream 122, and a recycle stream 124, described further below. A vacuum pump 126 is used on a permeate side of the membrane 120 to provide a vacuum [e.g., a vacuum of ~0.2 bar] such as to create a driving force for separation. A CO$_2$-depleted retentate or residue stream 128, such as containing less than 5 vol. % CO$_2$, leaves the first stage membrane separator 116 and is sent to a second stage membrane separator 130 such as including or containing a second stage high flux membrane 132 [e.g., a high permeance membrane (such as having or exhibiting a CO$_2$ permeance >1000 GPU, for example)]. A vacuum pump 136 is used on a permeate side of the membrane 132 to provide a vacuum [e.g., a vacuum of ~0.2 bar] such as to create a driving force for separation. Treated flue gas (e.g., the stream 136) can be further processed or disposed such as may be desired such as by being sent to the stack, for example.

The CO$_2$-enriched permeate from the first stage membrane separator 116 (e.g., the stream 140) can advantageously be processed to remove most of the water as liquid (e.g., shown as a stream 142). As shown, such water removal processing may involve cooling, such as via a gas cooler 144 and subsequent separation such as via a water knockout unit 146. A resulting stream 150 of non-condensables and such as containing or including greater than 95 vol. % CO$_2$ can be forwarded, such as a stream 152 and can be advantageously processed. e.g., compressed in stages at high pressures form a stream of CO$_2$ for sequestration.

The permeate stream 160 from the second stage membrane separator 130 can be similarly processed to remove most of the water as liquid (e.g., shown as a stream 162) and is then recycled (see stream 124) to the feed to a first stage membrane separator 116. As shown, such water removal processing may involve cooling, such as via a gas cooler 164 and subsequent separation such as via a water knockout unit 166.

In the processing system 110, the membrane 120 of the first stage membrane separator 116 is a high selectivity membrane (target CO$_2$/N$_2$ selectivity ≥200), whereas the membrane 132 of the second stage membrane separator 130 is a high-flux membrane (target CO$_2$ permeance ≥2,500 GPU).

While the processing system 110, described above, is believed to have particular applicability to the processing or capture of CO$_2$ from a flue gas stream containing at least 5 vol. % CO$_2$, such as produced or resulting from power plant operations utilizing pulverized coal, with appropriate modification, such or a similar system can be applied to the processing or capture of $CO_2$ from a flue gas stream containing less than 5 vol. % $CO_2$, such as produced or resulting from power plant operations utilizing natural gas, for example.

For $CO_2$ capture from natural gas-fired power plants, such as produce, form or result in flue gas containing less than 5 vol. % $CO_2$, a system or processing arrangement such as shown in FIG. 1, can be modified such that the low-$CO_2$-concentration flue gas (e.g., ~4-5% $CO_2$) will be directly fed to the second stage membrane separator and with high purity $CO_2$ (≥95%) will still be collected from the permeate side of the membrane of the first stage membrane separator. Such a system and processing will be described below making reference to FIG. 2.

Figure 2:
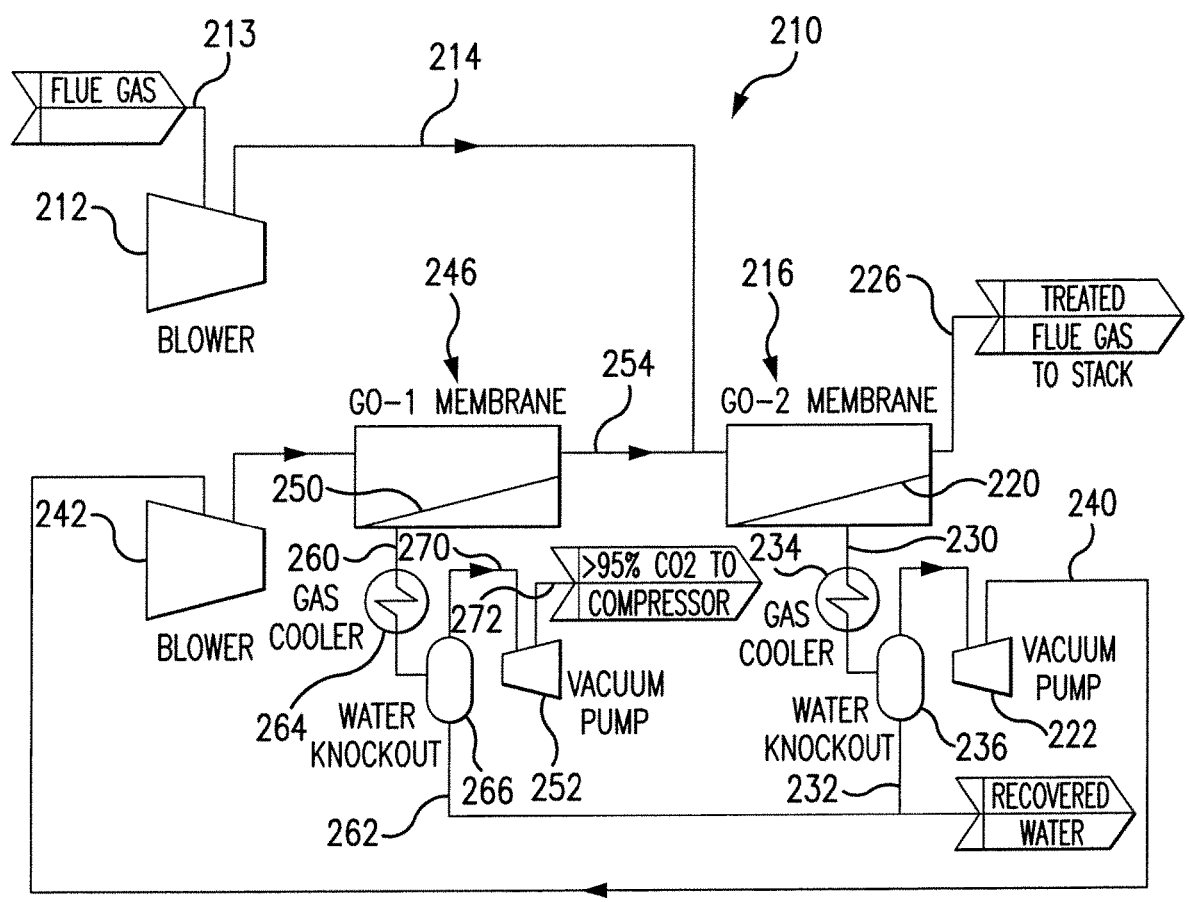
FIG. 2 is a simplified process flow diagram illustrating application of processing in accordance with an alternative embodiment of the invention.

FIG. 2 is a process flow diagram of a processing system, generally designated by the reference numeral 210, illustrating application of processing in accordance with one embodiment of the invention. As detailed below and in accordance with one embodiment of the invention, the processing system 210 can advantageously energy efficiently process the capture of $CO_2$ from a flue gas stream containing less than 5 vol. % $CO_2$. For example, such embodiment might find particular application in the processing of $CO_2$-containing flue gas streams produced or resulting from power plant operations utilizing natural gas, including installed in new or retrofitted into existing operations. It is to be understood, however, that the broader practice of the invention is not necessarily so limited.

In the processing system 210, a blower 212 is used to boost the pressure of the flue gas (stream 213), such as from 14.2 psia to 21.2 psia (e.g., Δ7 psig), prior to sending the elevated pressure flue gas stream 214 and such as containing less than 5 vol. % $CO_2$ to a second stage membrane separator 216 such as including or containing a second stage high flux membrane 220 [e.g., a high permeance membrane (such as having or exhibiting a $CO_2$ permeance >1000 GPU, for example)].

A vacuum pump 222 is used on a permeate side of the membrane 220 to provide a vacuum [e.g., a vacuum of ~0.2 bar (2.9 psia)] such as to create a driving force for separation. A $CO_2$-depleted retentate stream 226 can be further processed or disposed such as may be desired such as by being sent to the stack, for example.

The permeate stream 230 leaving the second stage membrane separator 216 can advantageously be processed to remove most of the water as liquid (e.g., shown as a stream 232). As shown, such water removal processing may involve cooling, such as via a gas cooler 234 and subsequent separation such as via a water knockout unit 236. A resulting stream 240 of non-condensables is sent (such as via a blower 242) as feed to first stage membrane separator 246 such as including or containing a first stage high $CO_2/N_2$ selectivity membrane 250 [e.g., a high selectivity membrane (such as a graphene oxide (GO)-based membrane) having or exhibiting a $CO_2/N_2$ selectivity >120, for example)]. A vacuum pump 252 is used on a permeate side of the membrane 250 to provide a vacuum [e.g., a vacuum of ~0.2 bar] such as to create a driving force for separation. A $CO_2$-depleted retentate or residue stream 254 leaves the first stage membrane separator 246 and is fed or introduced to the second stage membrane separator 216 such as including or containing the second stage high flux membrane 220 [e.g., a high permeance membrane (such as having or exhibiting a $CO_2$ permeance >1000 GPU, for example)]. The permeate stream 260 from the first stage membrane separator 246 can advantageously be processed to remove most of the water as liquid (e.g., shown as a stream 262). As shown, such water removal processing may involve cooling, such as via a gas cooler 264 and subsequent separation such as via a water knockout unit 266. A resulting stream 270 of non-condensables and such as containing or including greater than 95 vol. % $CO_2$ can be forwarded, such as a stream 272 and can be advantageously processed. e.g., compressed in stages at high pressures form a stream of $CO_2$ for sequestration.

While the broader practice of the invention does not necessarily require that suitable high selectivity membranes in or for the first stage membrane separator and suitable high-flux membranes in or for the second stage membrane separator be of a specific or particular form or construction, it has been found that graphene oxide (GO)-based membranes can be usefully employed for such high selectivity membranes and/or such high-flux membranes. U.S. Pat. No. 9,795,931 to Yu et al., issued 24 Oct. 2017, is an example of a patent describing some such type of graphene oxide (GO)-based membranes.

The target $CO_2$ permeance and $CO_2/N_2$ separation performances for high selectivity membranes (Membrane I) and high-flux membranes (Membrane II) in accordance with certain preferred aspects of the invention are listed or shown below in Table 1.

TABLE 1

Target $CO_2/N_2$ separation performance for Membranes I and II.

| Membrane | $CO_2$ permeance (GPU) | $CO_2/N_2$ selectivity |
|---|---|---|
| Membrane I (high selectivity) | 1,000 | 200 |
| Membrane II (high-flux) | 2,500 | 20 |

Is respectively noted that 70% $CO_2$ removal can be achieved by a single Membrane I stage. For 90% $CO_2$ removal, a two-stage membrane process may be desired.

An economic evaluation for parasitic energy requirements and capital costs was based on analysis and methods as presented in the 2013 version of the DOE Baseline Report, i.e., DOE/NETL-2010/1397, Volume 1: Bituminous Coal and Natural Gas to Electricity, *Cost and Performance Baseline for Fossil Energy Plants*, Revision 2a, p 63, September, 2013. Costs for fuel and consumables (in 2012 $) except membrane cost, were specified by the DOE. A target membrane cost of $30/m$^2$ (in 2012 $) was used for this economic evaluation. For a 550 MW$_e$ (net) power plant, the required membrane area is 2.5×10$^6$ m$^2$. Table 2 shows the constituents that make up the COE, and total COE. As shown, the process can achieve 90% $CO_2$ capture rate with 95% $CO_2$ purity at a COE 26.4% less than the baseline approach (DOE case B12B). For a 70% $CO_2$ capture case, the COE is 30.4% lower than the baseline approach.

TABLE 2

Constituents of COE, and total COE for carbon capture.

| | $CO_2$ capture rate | | |
|---|---|---|---|
| Constituents of COE ($/MWh) | 90% DOE Case B12B | 90% using integrated Membranes I and II | 70% using Membrane I only |
| Total capital costs | 72.2 | 51.2 | 47.2 |
| Total fixed operating costs | 15.4 | 6.9 | 6.4 |

TABLE 2-continued

Constituents of COE, and total COE for carbon capture.

| Constituents of COE ($/MWh) | CO₂ capture rate | | |
|---|---|---|---|
| | 90% DOE Case B12B | 90% using integrated Membranes I and II | 70% using Membrane I only |
| Total variable operating costs | 14.7 | 9.0 | 8.3 |
| Coal | 30.9 | 30.9 | 30.9 |
| Total COE excluding TS&M ($/MWh) | 133.2 | 98.0 | 92.8 |
| % of COE less than DOE Case B12B | — | 26.4 | 30.4 |

The current invention, functionally, has the benefits of a hybrid system but the simplicity of a membrane system which also reduces the up-front installation costs and footprint and does not add circulating liquids to the power plant environment. Therefore, it facilitates the ease of integration into a power plant.

The current invention serves as a platform for $CO_2$ capture from both coal-fired and natural gas-fired power plants. This invention will provide step reductions in $CO_2$ capture cost and energy penalties and will meet DOE's performance and cost goals. This invention is well suited for new and existing pulverized coal power plants due to the reduced footprint requirement and a much lower visual impact.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

Moreover, those skilled in the art and guided by the teachings herein identified, described or discussed will understand and appreciate that the subject development encompasses a variety of features and is thus capable of manifestation in a variety of specific forms or embodiments and is thus not to be construed as limited to the specific forms or embodiments herein identified or described.

What is claimed includes:

1. A system for capture of $CO_2$ from a flue gas stream, the system comprising:
   a first stage membrane separator containing a first stage $CO_2/N_2$ selectivity membrane, wherein the first stage $CO_2/N_2$ selectivity membrane is a graphene oxide-based membrane;
   a first stage vacuum pump to provide a vacuum on a permeate side of the first stage $CO_2/N_2$ selectivity membrane;
   wherein the first stage membrane separator produces a first stage $CO_2$-depleted retentate stream and a first stage $CO_2$-enriched permeate stream;
   a second stage membrane separator containing a second stage high-flux membrane having a $CO_2$ permeance of ≥1,000 Gas Permeation Unit (GPU), wherein the second stage high-flux membrane is a graphene oxide-based membrane, the second stage membrane separator receiving the first stage $CO_2$-depleted retentate stream;
   a second stage vacuum pump to provide a vacuum on a permeate side of the second stage high-flux membrane; and
   a blower between the second stage vacuum pump and the first stage membrane separator;
   wherein the second stage membrane separator produces a second stage $CO_2$-depleted retentate stream and a second stage $CO_2$-enriched permeate stream, wherein the second stage $CO_2$-enriched permeate stream is introduced back as a feed to the first stage membrane separator via the blower.

2. The system of claim 1 wherein the flue gas stream contains at least 5 vol. % $CO_2$, the system further includes a feed line to introduce the flue gas stream containing at least 5 vol. % $CO_2$ to the first stage membrane separator.

3. The system of claim 1 wherein the flue gas stream contains less than 5 vol. % $CO_2$, the system further includes a feed line to introduce the flue gas stream containing less than 5 vol. % $CO_2$ to the second stage membrane separator.

4. The system of claim 1 additionally comprising a cooler to cool at least one of the first stage $CO_2$-enriched permeate stream and the second stage $CO_2$-enriched permeate stream to condense and separate water therefrom.

5. The system of claim 1 wherein the first stage $CO_2/N_2$ selectivity membrane has a target $CO_2/N_2$ selectivity of ≥120.

6. The system of claim 1 additionally comprising a cooler to cool the first stage $CO_2$-enriched permeate stream, disposed between the first stage vacuum pump and the first stage membrane separator.

7. The system of claim 1 wherein the second stage $CO_2$-enriched permeate stream is introduced to the flue gas before the first stage membrane separator.

8. The system of claim 7 additionally comprising a cooler to cool the first stage $CO_2$-enriched permeate stream, disposed between the first stage vacuum pump and the first stage membrane separator.

9. The system of claim 1 wherein the flue gas is introduced to the first stage $CO_2$-depleted retentate stream before the second stage membrane separator.

10. The system of claim 9 additionally comprising a cooler to cool the second stage $CO_2$-enriched permeate stream, disposed between the second stage vacuum pump and the second stage membrane separator.

11. The system of claim 10 additionally comprising a water removal device between the cooler and the second stage vacuum pump.

12. The system of claim 11 additionally comprising a cooler to cool the first stage $CO_2$-enriched permeate stream, disposed between the first stage membrane separator and the first stage vacuum pump.

13. The system of claim 11 wherein the blower is configured to introduce the flue gas stream and the second stage $CO_2$-enriched permeate stream to the first stage membrane separator.

14. The system of claim 1 additionally comprising a feed line with a second blower to introduce the flue gas stream directly to the second stage membrane separator.

15. The system of claim 14, wherein the flue gas stream is introduced with the first stage $CO_2$-depleted retentate stream to the second stage membrane separator.

16. An energy efficient process using the system of claim 1 for the capture of $CO_2$ from a flue gas stream containing at least 5 vol. % $CO_2$, the process comprising:
   introducing the flue gas stream containing at least 5 vol. % $CO_2$ to the first stage membrane separator containing the first stage $CO_2/N_2$ selectivity membrane to produce the first stage $CO_2$-depleted retentate stream and a first stage $CO_2$-enriched permeate stream;

introducing the first stage $CO_2$-depleted retentate stream to the second stage membrane separator containing the second stage high-flux membrane to produce the second stage further $CO_2$-depleted retentate stream and a second stage $CO_2$-enriched permeate stream;

treating the second stage $CO_2$-enriched permeate stream to recover water and form a recyclable $CO_2$ stream;

introducing the recyclable $CO_2$ stream to the first stage membrane separator;

treating the first stage $CO_2$-enriched permeate stream to recover water and form a non-condensable $CO_2$-rich stream; and compressing the $CO_2$ of the non-condensable $CO_2$-rich stream to form a capture quantity of $CO_2$.

17. An energy efficient process using the system of claim 1 for the capture of $CO_2$ from a flue gas stream containing less than 5 vol. % $CO_2$, the process comprising:

introducing the flue gas stream containing less than 5 vol. % $CO_2$ to the second stage membrane separator containing the second stage high-flux membrane to produce the second stage $CO_2$-depleted retentate stream and the second stage $CO_2$-enriched permeate stream;

treating the second stage $CO_2$-enriched permeate stream to recover water and form a recyclable $CO_2$ stream;

introducing the recyclable $CO_2$ stream to the first stage membrane separator containing a first stage $CO_2/N_2$ selectivity membrane to produce the first stage $CO_2$-depleted retentate stream and the first stage $CO_2$-enriched permeate stream;

treating the first stage $CO_2$-enriched permeate stream to recover water and form a non-condensable $CO_2$-rich stream;

introducing the first stage $CO_2$-depleted retentate stream to the second stage membrane separator; and compressing the non-condensable $CO_2$-rich stream to a sequestration pressure.

\* \* \* \* \*